(12) United States Patent
Moskob

(10) Patent No.: US 6,280,359 B1
(45) Date of Patent: Aug. 28, 2001

(54) ECCENTRIC TOOTHED GEAR

(75) Inventor: Frank Moskob, Buchl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/402,070

(22) PCT Filed: Jan. 20, 1999

(86) PCT No.: PCT/DE99/00119

§ 371 Date: Dec. 6, 1999

§ 102(e) Date: Dec. 6, 1999

(87) PCT Pub. No.: WO99/39114

PCT Pub. Date: Aug. 5, 1999

(30) Foreign Application Priority Data

Jan. 30, 1998 (DE) .............................. 198 03 747

(51) Int. Cl.⁷ .............................. F16H 1/32; H02K 7/116
(52) U.S. Cl. .............................. 475/149; 475/162
(58) Field of Search .................... 475/149, 162

(56) References Cited

U.S. PATENT DOCUMENTS

| | | | |
|---|---|---|---|
| 1,350,077 | * | 8/1920 | Loudon ................ 475/149 |
| 1,563,945 | * | 12/1925 | Apple ................... 475/149 |
| 1,799,348 | * | 4/1931 | Apple ................... 475/149 |
| 2,991,665 | * | 7/1961 | Sundt ................... 475/149 |
| 4,228,698 | * | 10/1980 | Winiasz ................ 475/149 |
| 4,231,551 | * | 11/1980 | Ikeda ................... 475/149 |

FOREIGN PATENT DOCUMENTS

| | | | |
|---|---|---|---|
| 9116261.0U | * | 11/1992 | (DE) . |
| 4127051A | * | 2/1993 | (DE) . |
| 19729620A | * | 1/1998 | (DE) . |
| 0840037A2 | * | 5/1998 | (EP) . |
| 428920 | * | 6/1938 | (FR) . |

* cited by examiner

Primary Examiner—Dirk Wright
(74) Attorney, Agent, or Firm—Michael J. Striker

(57) ABSTRACT

An eccentric gear drive has a drive mechanism with an eccentric element, an eccentric wheel with a set of teeth that is supported on the eccentric element, and a driver with another set of teeth. The teeth of the eccentric wheel and the teeth of the driver cooperate by meshing with one another in some portions. The eccentric wheel is rotatably connected to the eccentric element. The eccentric wheel also has guide elements which are guided directly or indirectly in a fixed housing cap.

8 Claims, 4 Drawing Sheets

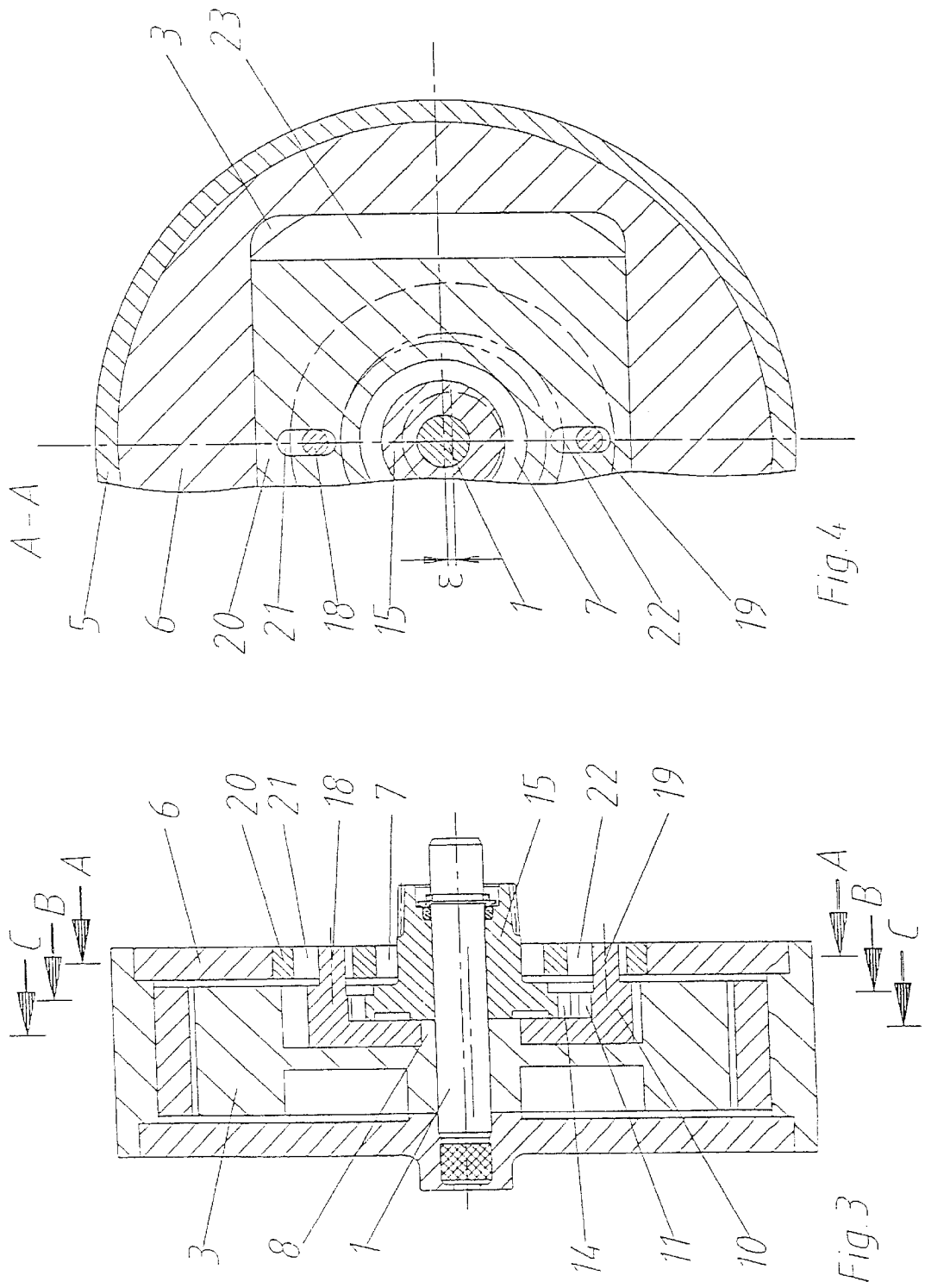

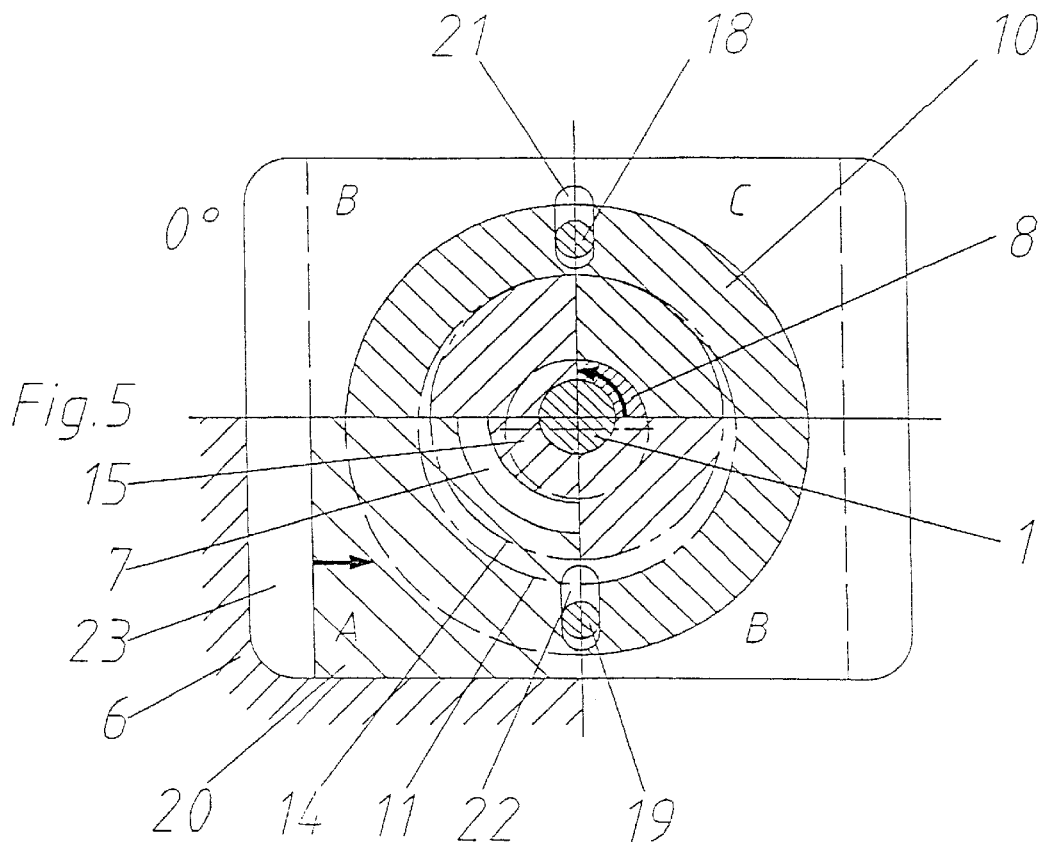
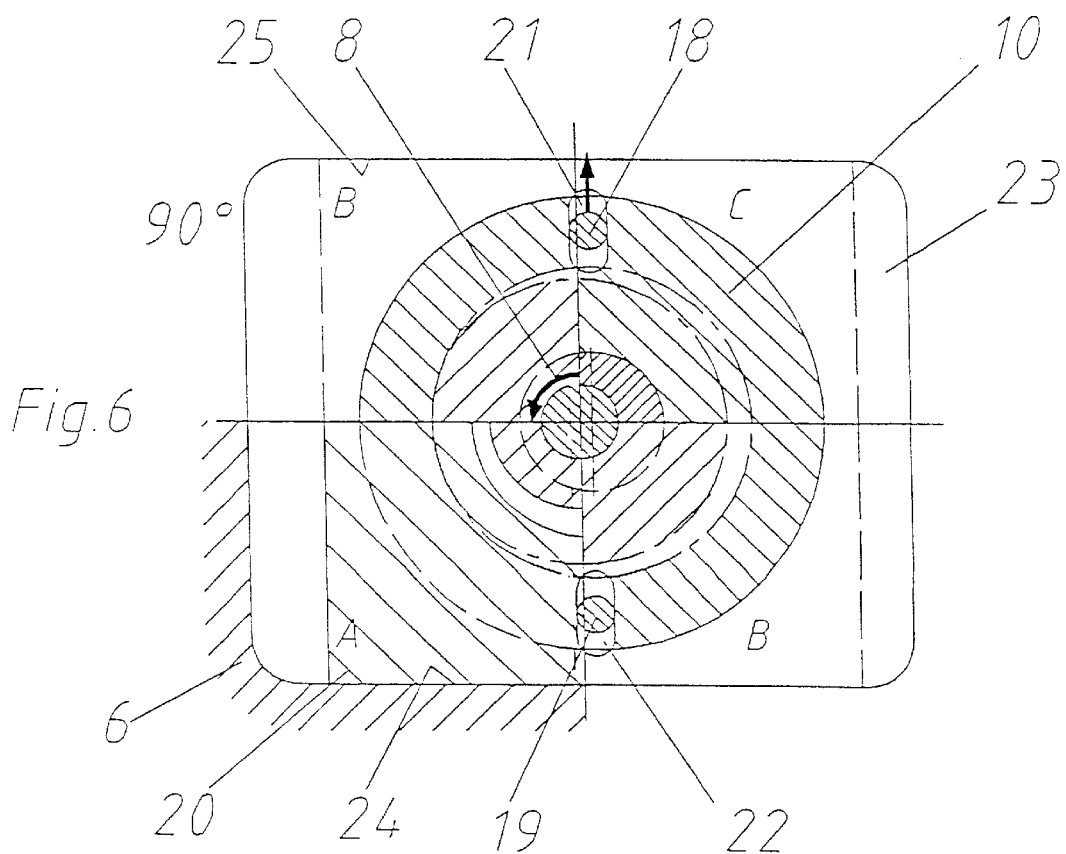

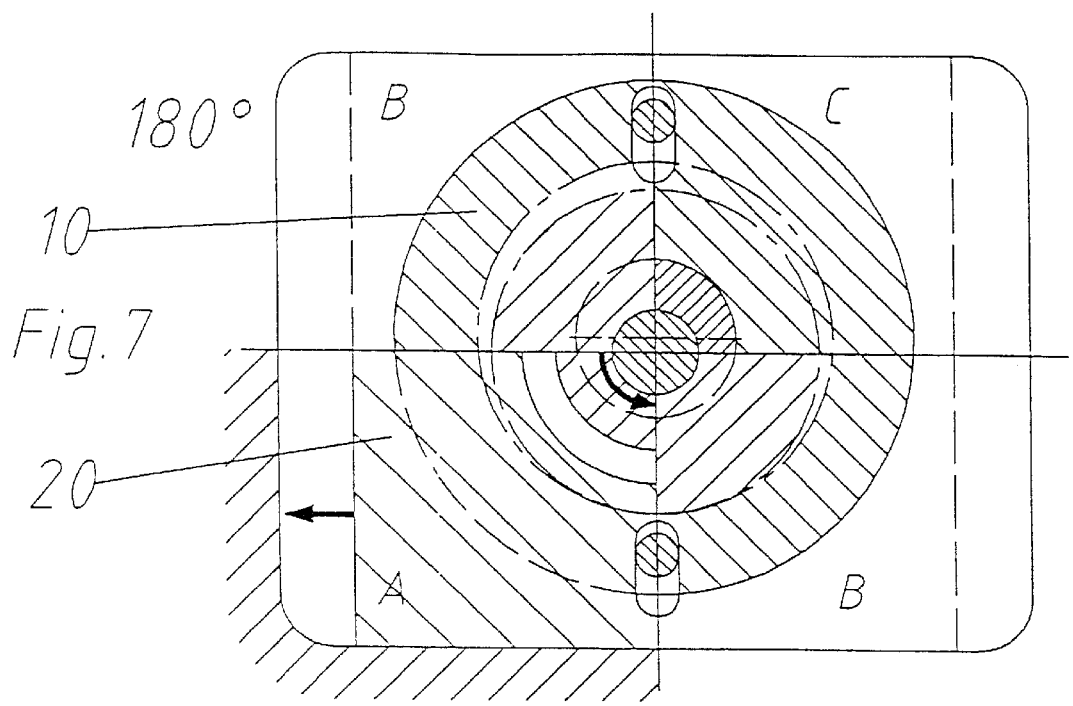
Fig. 7  180°
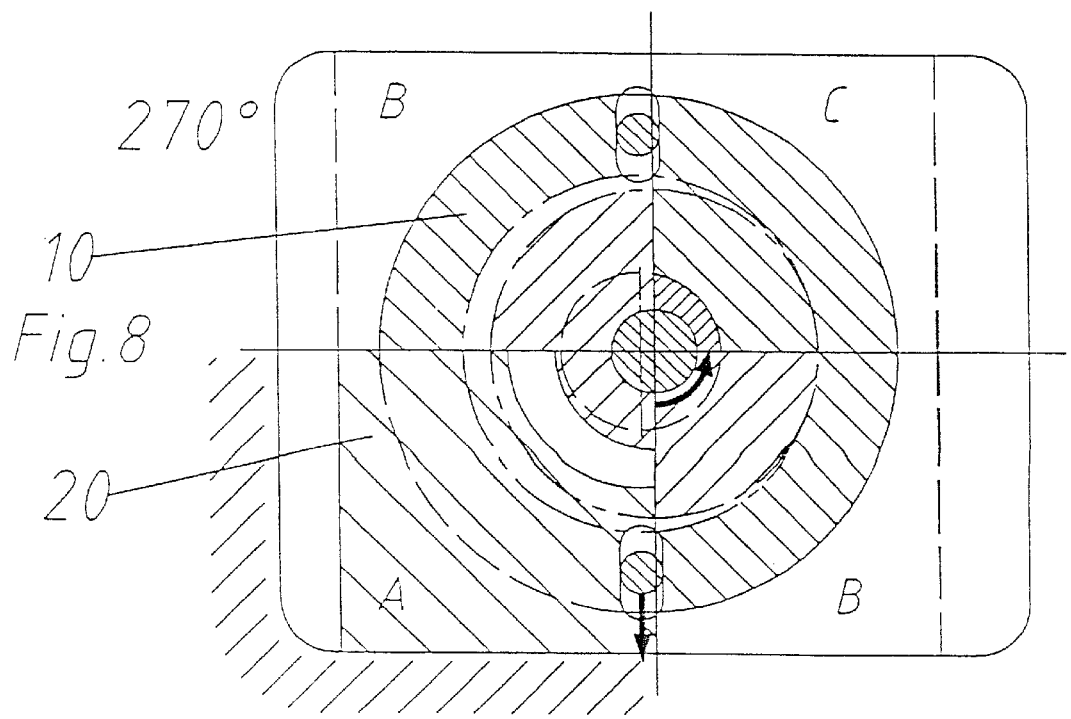
Fig. 8  270°

ECCENTRIC TOOTHED GEAR

BACKGROUND OF THE INVENTION

1. Field of the Invention

An eccentric gear drive according the invention serves to change the speed of the rotary motion of adjusting motors.

2. Prior Art

To reduce the rpm of adjusting motors with an armature rpm of approximately 7000 rpm, worm gears are used.

The worm gears used have the advantage of having self-locking from the power take-off side. The motors used have two carbon brushes and one commutator. Because of the high transmission ratio required to achieve sufficient torque, for instance for driving a window raiser in a motor vehicle, the external dimensions of an adjusting motor made up of a motor and a transmission located beside it are considerable.

SUMMARY OF THE INVENTION

An eccentric gear drive according to the invention has the advantage that it has very compact dimensions, is self-locking and is simple in design.

Compared with the known worm gears, the eccentric gear drive is comparatively insensitive to tolerances, since all the rotating parts are supported on a shaft. In a further refinement, a single guide element is provided, which by means of the guidance in the fixed housing part prevents the complete rotation of the eccentric wheel. Only a cyclical motion of the eccentric wheel about the center position occurs.

To make the motion of the eccentric wheel, and in particular the torque, uniform, the guide element is disposed, at a radial spacing from the center axis that extends past the eccentric wheel, on a bearing arm joined to the eccentric wheel; the radial spacing should be selected to be as great as possible. The power takeoff is already made uniform by this lengthening of the lever arm.

An at least theoretically completely uniform power take-off is attained in that the housing part has one guide element in a direction perpendicular to the center axis, and that the eccentric wheel has two guide elements, which are guided in a direction perpendicular to the center axis and perpendicular to the direction of motion of the guide element. Because of the decoupled guidance of the eccentric wheel in the two guide directions perpendicular to the pivot axis, any rotary motion whatever of the eccentric wheel is averted. As a result, a completely uniform power takeoff is achieved. Since the guide mechanism completely (by self-locking) absorbs all the torques that act from outside on the power takeoff, the gear can be used for control processes in which the set portion is maintained even when force is being exerted. One example of this is its use for electric window raisers.

In an advantageous refinement, the drive mechanism of the eccentric gear drive is formed by an armature of an electric motor. Because the motor is integrated directly with the gear, the total installation space required is reduced still further. In a refinement, a complete unit, comprising the eccentric gear drive and the motor, is created.

BRIEF DESCRIPTION OF THE DRAWINGS

An adjusting motor with an eccentric gear drive is shown in the drawing.

FIG. 3 shows a second exemplary embodiment of an eccentric gear drive;

FIG. 4 is a section taken along the line A—A of FIG. 3; and

FIGS. 5–8 show a sequence of component motions in the course of one complete revolution of the eccentric wheel.

DETAILED DESCRIPTION OF THE INVENTION

Figure 1:
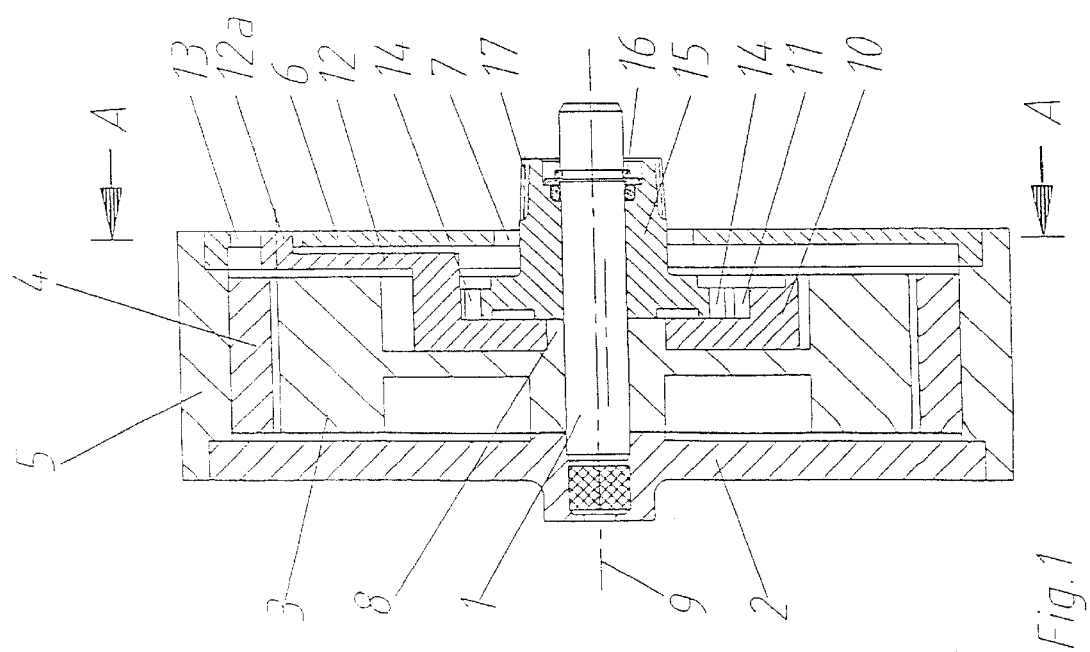
FIG. 1 shows an electric motor with a first eccentric gear drive in longitudinal section.

In FIG. 1, an electric motor with an integrated eccentric gear drive is shown in longitudinal section. A shaft 1, which is secured in a housing bottom 2 in a manner fixed against relative rotation, is clearly visible. An armature 3 is rotatably supported on the shaft 1 and is driven by coils 4. The coils 4 are disposed, lying on the inside, in a cylindrical housing portion 5, and the housing bottom is also secured to the housing portion 5. A housing cap 6 with a central opening 7 is mounted on the side of the motor housing 5 opposite the housing bottom. The other end of the shaft 1 protrudes through this central opening 7.

The armature 3 disposed in the interior of the chamber formed by the housing bottom 2, motor housing 5 and housing cap 6 is provided with an eccentric element 8, which extends axially along the center axis 9. Seated on the eccentric element 8 is an eccentric wheel 10, which via a journal 12a acting as a guide element, which here is spaced radially on a bearing arm 12 as far as possible from the shaft 1 in order to lengthen the lever arm, is guided loosely in a radially extending opening 13 of the housing cap 6.

A set of inner teeth 11 is formed on an inside circumference of the eccentric wheel 10. These inner teeth 11 mesh in some portions with the set of outer teeth 14 of a driver 15, which is secured rotatably on the shaft 1 by the fastening means 16. The driver 15 protrudes out of the motor housing through the housing cap 6 and is provided in this region with a further set of outer teeth 17.

The mode of operation of the adjusting motor with the eccentric gear drive will now be explained. Taking the fixed housing as a point of departure, which is formed of the nonmoving parts comprising housing bottom 2, cylindrical housing portion 5 and housing cap 6 along with the shaft 1 connected in a manner fixed against relative rotation to the housing bottom 2, a magnetic field is induced above the coils 4 that are solidly joined to the cylindrical housing portion 5, and this causes the armature 3 to begin rotating about the shaft 1. As a result of the rotation of the armature 3 about the shaft 1, a motion of the eccentric wheel 10 takes place in the region of the eccentric element 8. This motion is specified on the one hand by the eccentric element 8, and on the other by the journal 12a that is guided laterally, i.e., circumferentially, in the opening 13 in the housing cap 6. This journal 12a prevents a rotary motion of the eccentric wheel 10 when the armature 3 rotated, and causes the eccentric wheel to be moved in a direction at right angles to the pivot axis 9. In the process, the eccentric wheel moves not only up and down but also follows the eccentric element, including into and out of the plane of the drawing. This motion is similar to that of a connecting rod of a piston drive mechanism, but in the embodiments according to the invention the eccentricity is as a rule markedly less.

Because of this eccentric motion of the eccentric wheel 10, only part of the set of inner teeth 11 engages, or meshes with, the outer teeth 14 of the driver 15. In the lower half of FIG. 1, the inner teeth 11 are spaced apart markedly far from the outer teeth 14, while conversely, in the upper half, the inner teeth are in engagement with the outer teeth 14 of the driver 15. The direction of rotation of the driver 15 is opposed to that of the armature 3 because of the rotation of the armature 3 and the motion of the eccentric wheel 10.

Figure 2:
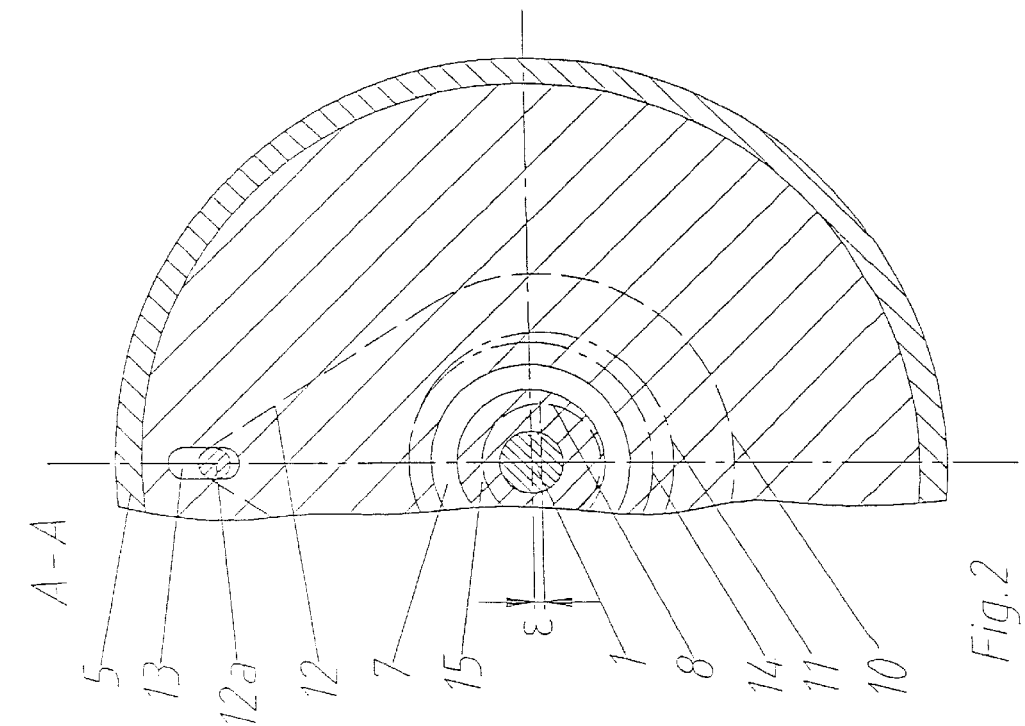
FIG. 2 is a section taken in the region of the gear along the line A—A of FIG. 1.

FIG. 2 shows a section taken along the line A—A of FIG. 1. The shaft and the eccentric element 8, shown as a dashed line and disposed about the shaft 1, can be seen. The eccentricity is slight, compared with the spacing from the journal 12*a*. The journal 12*a* is guided in the opening 13 in the housing cap 6 in such a way that it can rotate and can be displaced longitudinally. The eccentric wheel 10 is shown in its lowermost position; that is, in this coordinate system the spacing is at a maximum. As a consequence, on the side of the deflection, the inner teeth 11 of the eccentric wheel 10 are not in engagement with the outer teeth 14 of the driver 15. A crescent-shaped gap exists between the inner teeth 11 and the outer teeth 14; its width is decreased by the increasing engagement on the side opposite the eccentricity.

It is true that it is possible in principle to dispose the journal 12*a* on the eccentric wheel 10 without a bearing arm 12, but a long bearing arm has the advantage that the power takeoff motion is made uniform with regard to the angular speed.

In FIG. 3, a further exemplary embodiment with a uniform power takeoff is shown. For identical elements, the same reference numerals as in the preceding drawing figures are used. Here, it is the differently embodied eccentric wheel 10 and its guidance in the housing cap 6 that will be explained in particular. The eccentric wheel 10 is seated on the eccentric element 8 of the armature 3 and is provided with the set of inner teeth 11. In contrast to the first exemplary embodiment, two guide elements, in the form of two journals 18, 19, are secured to the eccentric wheel 10 parallel shaft 1; in the region of the housing cap 6, they are guided longitudinally in a further guide element in the form of a slide 20. To that end, the slide 20 has openings 21 and 22, which can be called oblong slots. The slide 20 is in turn guided longitudinally displaceably in a recess 23 of the housing cap 6, in a direction of motion that is perpendicular to the journal 18 or 19.

This double guidance is intended to prevent rotation of the eccentric wheel and at the same time to enable the motion of the eccentric element; that is, to enable the superposition of two directions of motion that are perpendicular to one another.

In FIG. 4, the disposition of the slide 20 in the housing cap 6 is clearly seen. The slide 20 is shown in a middle position, since the eccentric element is in a lower position of maximum deflection. The journals 18 and 19 are in their maximal lower position, and the eccentric wheel is positively joined, by meshing teeth, to the driver in the upper region of the teeth, or in other words in the vicinity of the bolt 18. With progressive motion, the time interval between the slide 20 and the boundary of the opening 23 decreases by a maximum of the amount of the eccentricity . Because of the double guidance, the orbiting motion is transmitted uniformly, without disruption, to the driver 15. In FIGS. 5–8, various positions of the individual components relative to one another are shown as a function of the rotational angle. In the drawings, various sectional planes A, B, C of the sectional view in FIG. 3 are shown, and the direction of motion is indicated by arrows.

In FIG. 5, the position shown so far is indicated as the starting point, indicated by the angle 0 . In field A, the slide 20 is shown, which is in its middle position and is in the process of executing a motion to the right, with progressive rotation.

The journals 18, 19 are in a maximal lower position in their guides 21, 22. From the section in field C, the location of the eccentric element 8 can be seen in full section, while in the other fields A and B the eccentric element 8 is represented by a dashed line. An arrow is shown, to mark the eccentric element and indicate its direction of rotation.

Field A also shows the driver 15 and the opening 7 in the slide 20. The pitch circle of the inner teeth 11 of the eccentric element and the pitch circle of the outer teeth 14 of the driver 15 are also shown. Because of the progressive change in position, a variable gap forms between these pitch circles.

In FIG. 6, the eccentric element 8 has been shown rotated 90° counterclockwise. As a consequence of this rotation, the eccentric wheel 10 has been moved to the right and lifted in the process. This is also expressed in the fact that the journals 18, 19 have migrated upward in the oblong slots 21, 22 and that the space 23 on the side has decreased in size. Rotation of the eccentric wheel 10, however, has not occurred, since this degree of freedom is restricted because of the doubly guided journals 18, 19. The guidance of the slide 20 in the housing cap is effected along the side faces 24, 25. The slide 20 has its maximum deflection to the right-hand side of the drawing, by the amount of the eccentricity.

In FIG. 7, after another rotation of the eccentric element 8 by a further 90 to the 180 position, the position shown is the opposite of that in FIG. 5. The slide 20 is now in its middle position, and the eccentric wheel 10 is maximally deflected upward, again by the amount of the eccentricity .

In FIG. 8, after rotation by another 90 for a total of 270 the opposite position from FIG. 7 is shown. The slide 20 is located in its maximally deflected position toward the left-hand side of the drawing, and the eccentric wheel 10 is in a vertical middle position.

AS the drive mechanism, an armature with brushes or a brushless (electronically commutated) armature can be used. It is especially advantageous that the gear can be embodied in self-locking fashion and is comparatively insensitive to tolerances compared with worm gears, since also its rotating parts are supported on a shaft. Naturally, it is also possible, instead of the armature, to provide a worm wheel of a worm gear, for instance, which could then be considered as the first stage of a two-stage gear. For the mode of operation of the gear, the way in which the drive of the eccentric element is effected is insignificant.

With the armature in rotation, the eccentric wheel moves in the Y direction in the guide holes 21, 22 of the slide 20, and the slide moves in the X direction. The eccentric wheel thus moves along a circular orbit, but without rotating about its own axis. A uniform power takeoff at the driver 15 is thereby achieved.

What is claimed is:

1. A motor for an eccentric gear drive, comprising a housing including a fixed housing part; a drive mechanism which is an armature of an electric motor, the armature having an eccentric element; an eccentric wheel supported on the eccentric element and having a set of first teeth; and a driver having a set of second teeth, the first teeth cooperating with the second teeth by meshing with one another in some portions thereof, the eccentric wheel being rotatably connected to the eccentric element, the fixed housing part having a guide and the eccentric wheel having at least one guide element guided in the guide of the fixed housing part for connecting the eccentric wheel in a manner fixed against relative rotation.

2. The motor of claim 1, wherein the at least one guide element is directly guided in the guide.

3. The motor of claim 1, wherein the at least one guide element is guided in the guide indirectly.

4. The motor of claim 1, wherein the at least one guide element a single guide element.

5. The motor of claim 4, wherein the motor has a central axis extending past the eccentric wheel and the single guide element is disposed at a radial spacing from the central axis, on a bearing arm joined to the eccentric wheel.

6. The motor of claim 1, wherein the motor has a central axis and the fixed housing part has one guide element in a direction perpendicular to the central axis and the eccentric wheel has two guide elements guided in the direction perpendicular to the central axis and perpendicular to a direction of motion of the one guide element of the fixed housing part.

7. The motor of claim 1, wherein the eccentric gear drive is self-locking with respect to a power takeoff.

8. A motor for an eccentric gear drive, comprising a motor housing bottom having an integrated bolt; an armature rotating on the integrated bolt and having an eccentric element; an eccentric wheel seated on the eccentric element and having a set of inner teeth and a guide element; a motor housing cap with a guide for the guide element for connecting the eccentric wheel in a manner fixed against relative rotation; a driver seated on the integrated bolt and having a set of outer teeth meshing with the inner teeth of the eccentric wheel; and coils integrated with the motor housing cap, for rotating the armature when a magnetic field is induced on the coils.

* * * * *